US006455846B1

(12) United States Patent
Prior et al.

(10) Patent No.: US 6,455,846 B1
(45) Date of Patent: Sep. 24, 2002

(54) SAMPLE INLET TUBE FOR ION SOURCE

(75) Inventors: David Prior, Hermiston, OR (US); John Price, Richland, WA (US); Jim Bruce, Oceanside, CA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/419,718

(22) Filed: Oct. 14, 1999

(51) Int. Cl.[7] .......................... B01D 59/44; H01J 49/00
(52) U.S. Cl. ..................... 250/288; 250/281; 250/492.1
(58) Field of Search ................................ 250/281, 288, 250/492.1

(56) References Cited

U.S. PATENT DOCUMENTS 6,031,241 A * 2/2000 Silfvast et al. ........... 250/493.1
6,177,669 B1 * 1/2001 Wells et al. ................ 250/288

* cited by examiner

*Primary Examiner*—John R. Lee
*Assistant Examiner*—Kalimah Fernandez
(74) *Attorney, Agent, or Firm*—Stephen R. May; Douglas E. McKinley, Jr.

(57) ABSTRACT

An improved inlet tube is positioned within an aperture through the device to allow the passage of ions from the ion source, through the improved inlet tube, and into the interior of the device. The inlet tube is designed with a larger end and a smaller end wherein the larger end has a larger interior diameter than the interior diameter of the smaller end. The inlet tube is positioned within the aperture such that the larger end is pointed towards the ion source, to receive ions therefrom, and the smaller end is directed towards the interior of the device, to deliver the ions thereto. Preferably, the ion source utilized in the operation of the present invention is a standard electrospray ionization source. Similarly, the present invention finds particular utility in conjunction with analytical devices such as mass spectrometers.

10 Claims, 4 Drawing Sheets

Horn Sample Inlet for improved Electrospray Ionization

SAMPLE INLET TUBE FOR ION SOURCE

This invention was made with Government support under Contract DE-AC0676RLO1830 awarded by the U.S. Department of Energy. The Government has certain rights in the invention.

FIELD OF THE INVENTION

The present invention relates generally to a method and apparatus for introducing ions into analytical and other types of instruments. Specifically, the present invention provides an improved sample inlet tube to achieve improved efficiency in transferring ions from an ionization source at a relatively high pressure, such as a electrospray ionization source, into the interior of a device at a relatively low pressure, such as a mass spectrometer.

BACKGROUND OF THE INVENTION

Many instruments utilize an ion stream produced at a given pressure which are introduced into an apparatus or instrument having an interior maintained at a somewhat lower pressure. For example, many types of analytical equipment, particularly mass spectrometers, utilize ions produced at atmospheric pressure by a standard electrospray ionization source, or "ESI." An ESI is a small capillary into which a liquid analyte is injected at one end and wherein a stream of ions emerges from the opposite end. The ESI is typically maintained at some voltage and positioned proximate to a small aperture through a device, such as a mass spectrometer. The aperture serves as the entrance for ions into the device. The interior of the device, or vacuum chamber, is typically pumped to a pressure well below the pressure of ions leaving the ESI, thereby sucking some proportion of the ions through the aperture and into the vacuum chamber of the device at very high rates of speed. It is believed that the high rates of speed at which the ions travel, and the electrical forces surrounding the transfer of ions leaving the tip of the ESI and entering the device, typically create a highly turbulent flow in the ion stream flowing between the ESI and the entrance to the device. Unfortunately, this turbulent flow often results in many of the ions generated within the ESI failing to flow into the vacuum chamber of the device. In fact, it is believed that it is not uncommon for ESI sources to have less than one percent (1%) of the ions generated at the tip of the ESI be introduced into the vacuum chamber of the device. This inefficient transfer of ions into the device creates a variety of shortcomings which render it highly desirable to achieve much greater ion transfer efficiency. For example, increased efficiency in ion transfer allows a analytical instruments such as mass spectrometers to achieve much higher detection sensitivity. Those having skill in the art have long recognized the advantages of increased efficiency in ion transfer from standard ESI sources, and have long sought methods and techniques designed to increase this efficiency. Still, there exists a need for improved methods and apparatus which improve the efficiency in ion transfer.

OBJECTS

Accordingly, it is an object of the present invention to provide a method and apparatus which provides greater efficiency in the transmission of gaseous ions from an ion source situated in a region of relatively high pressure, to the interior of a device maintained at a relatively low pressure.

It is a further object of the invention to provide a method and apparatus which provides greater efficiency in the transmission of gaseous ions from an ion source utilizing thermal ionization, ion beams, electron impact ionization, laser irradiation, ionspray, electrospray, thermospray, inductively coupled plasmas, microwave plasmas, glow discharges, arc/spark discharges, hollow cathode discharges, gases generated by evaporation of condensed substances, laser ablation of condensed substances and mixtures thereof to form ions in a region of relatively high pressure, which are then transferred to the interior of a device maintained at a relatively low pressure.

It is a further object of the invention to provide a method and apparatus which improves the efficiency of the transmission of gaseous ions from an ion source in a region of relatively high pressure, which are then transferred to the interior of a device such as a linear quadrupole mass spectrometer, an ion trap quadrupole mass spectrometer, an ion cyclotron resonance mass spectrometer, a time of flight mass spectrometer, or an electric and/or magnetic sector mass spectrometer, which is maintained at a relatively low pressure.

SUMMARY OF THE INVENTION

These and other objects of the invention are accomplished by providing an improved inlet tube for transmitting ions from an ion source maintained in a region of relatively high pressure, to a device having an interior maintained at a relatively low pressure. The improved inlet tube is positioned within an aperture through the device to allow the passage of ions from the ion source, through the improved inlet tube, and into the interior of the device. The inlet tube is designed with a larger end and a smaller end wherein the larger end has a larger interior diameter than the interior diameter of the smaller end. The inlet tube is positioned within the aperture such that the larger end is pointed towards the ion source, to receive ions therefrom, and the smaller end is directed towards the interior of the device, to deliver the ions thereto. Preferably, the ion source utilized in the operation of the present invention is a standard electrospray ionization source. However, as will be apparent to those having skill in the art, the practice of the present invention may also be practiced with any method useful for generating ions, including, but not limited to, thermal ionization, ion beams, electron impact ionization, laser irradiation, ionspray, electrospray, thernospray, inductively coupled plasmas, microwave plasmas, glow discharges, arc/spark discharges, hollow cathode discharges, gases generated by evaporation of condensed substances, laser ablation of condensed substances and mixtures thereof. Similarly, the present invention finds particular utility in conjunction with analytical devices such as mass spectrometers, including but not limited to magnetic-bottle time of flight photoelectron spectrometers, linear quadrupole mass spectrometers, ion trap quadrupole mass spectrometers, ion cyclotron resonance mass spectrometers, time of flight mass spectrometers, and electric and/or magnetic sector mass spectrometers. While the general nature and operation of the present invention is thus shown and described, a more in depth understanding of the invention may be acquired through a discussion of some preferred embodiments of the present invention. More particularly, a discussion of prototypes of two such preferred embodiments and experiments with these prototype devices provides an illustrative example of the efficacy of the present invention.

DETAILED DESCRIPTION OF THE PREFERRED EMBODIMENT OF THE PRESENT INVENTION

While the examples provided in the preferred embodiments are illustrative of the nature and operation of the present invention, those skilled in the art will recognize that the general principles demonstrated in the preferred embodiments are readily applicable in a wide variety of manner, all of which would fall within the contemplation of the present invention. Accordingly, the following description of the present invention should only be regarded as illustrating the practice of the present invention, and the invention should not be understood as limited to the particular examples set forth herein, but rather should be broadly construed as including other variations and combinations within the spirit and scope of the claims set forth in the concluding portion of this specification.

Figure 1:
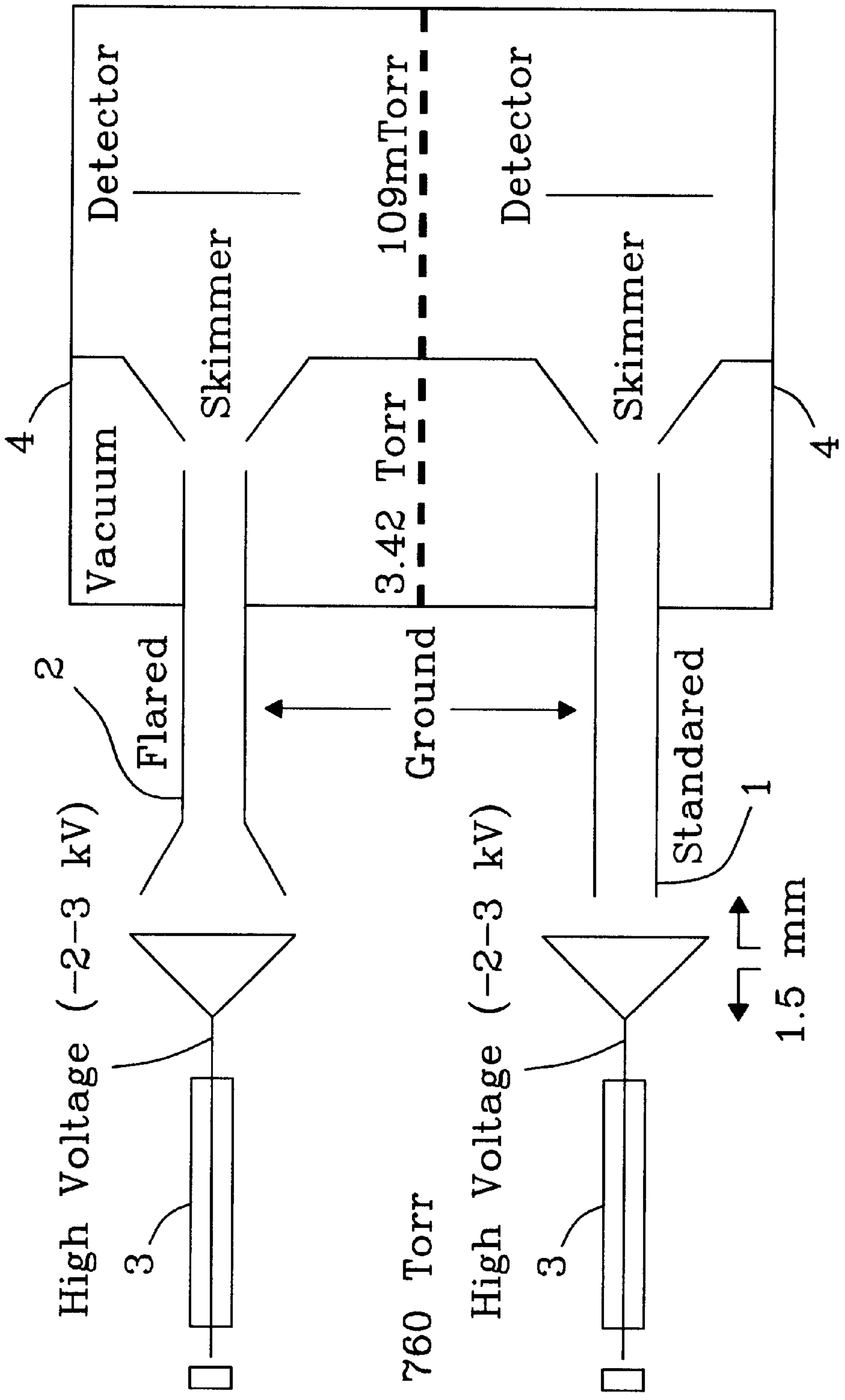
FIG. 1. Is a schematic drawing of a prototype of a first preferred embodiment of the present invention which was utilized in proof of principle experiments performed with a magnetic-bottle time of flight photoelectron spectrometer and an ESI source.

A set of prototype inlet tubes were fabricated to demonstrate the preferred embodiment of the present invention in series of experiments designed to demonstrate the efficacy of the present invention. As illustrated in FIG. 1, a standard inlet tube 1 and an improved inlet tube 2 fabricated to reduce a first preferred embodiment of the present invention to practice were installed in a magnetic-bottle time of flight photoelectron spectrometer 4 manufactured in the Environmental Molecular Sciences Laboratory at the Pacific Northwest National Laboratory. An ESI source 3 also manufactured in the Environmental Molecular Sciences Laboratory at the Pacific Northwest National Laboratory was then provided to generate a flow of ions through the standard inlet tube 1 and the improved inlet tube 2 of the present invention. Several runs of standard Iodine solution ($10^{-3}$ M in $H_2O/CH_3O_4$ solution in a ratio of 1/10) were injected into the ESI 3 over a range of voltages utilizing prototypes 2 of the present invention and a standard inlet 1 tubes for comparison. Current measurements of the ions transmitted through the capillary were observed with a picoammeter (not shown) down stream from the capillary tube inside the vacuum chamber for two sets of prototype inlet tubes, and one standard tube. All inlet tubes were the same length (232 mm) and had an internal diameter of 0.8 mm. The first inlet tube 1 was a simple, standard, straight sample inlet. The two sets of inlet tubes 2 were configured with flared ends to demonstrate the present invention. The first set consisted of five inlet tubes 2, each having the end flared at a 30 degree angle from the center line. The second set consisted of five inlet tubes 2, each having the end flared at a 45 degree angle from the center line.

Figure 2:
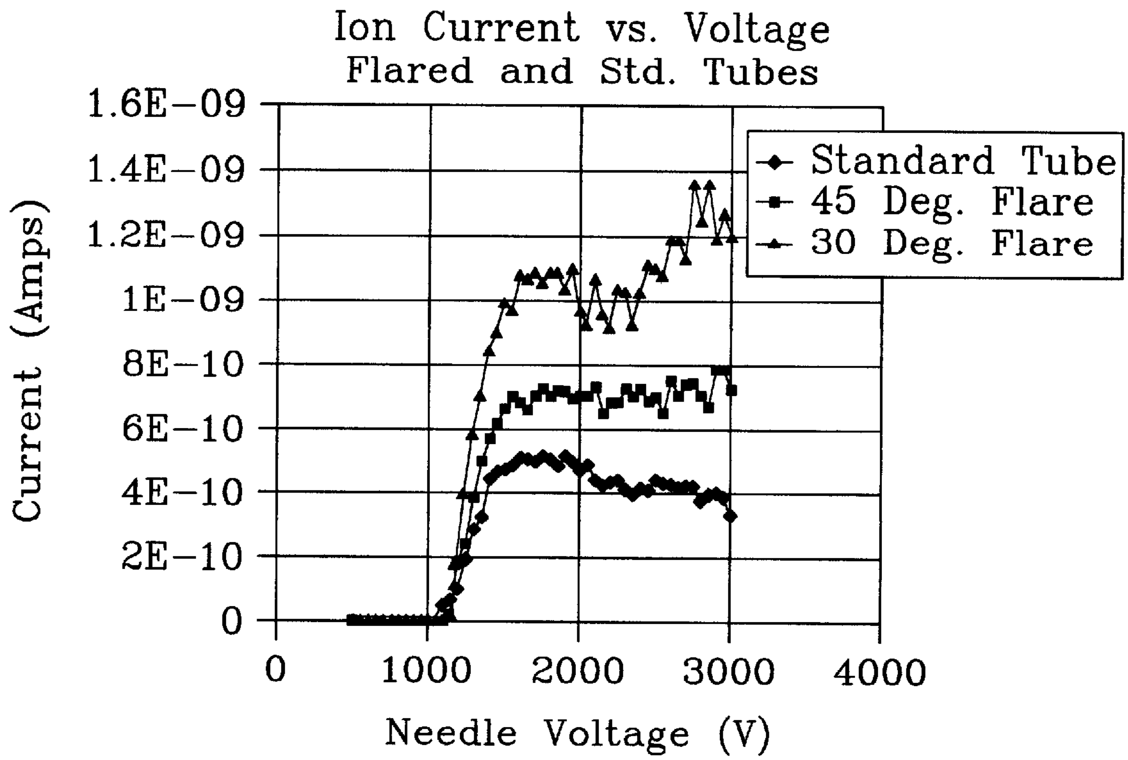
FIG. 2. Is a graph of the current of ions transmitted in a first set of proof of principle experiments from an ESI source maintained at a variety of voltages to a magnetic-bottle time of flight photoelectron spectrometer utilizing two separate prototypes of the present invention and a standard inlet tube for comparison.
Figure 3:
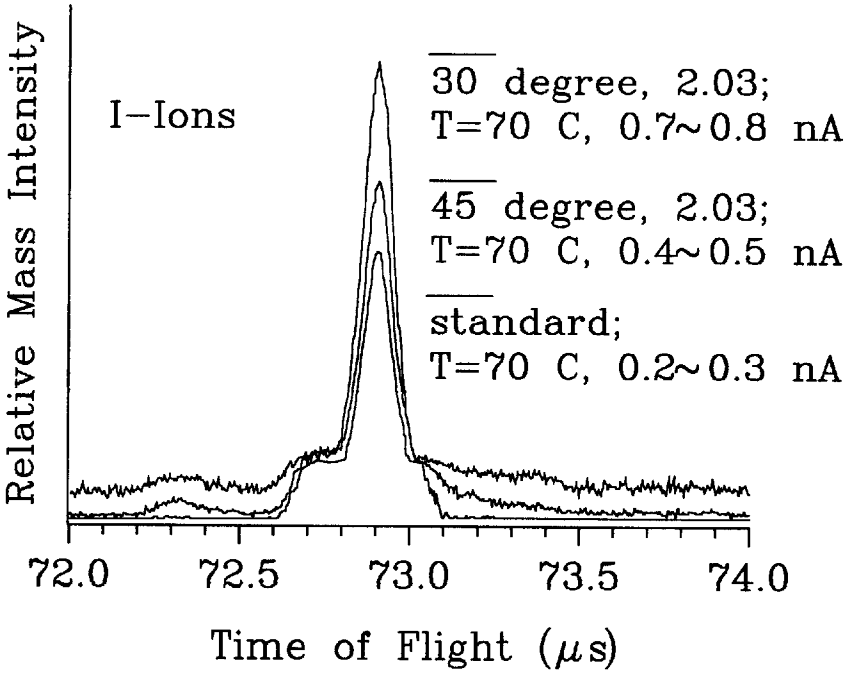
FIG. 3. Is a spectra of the relative mass intensity of ions transmitted in the first set of proof of principle experiments from an ESI source maintained at a variety of voltages to a magnetic-bottle time of flight photoelectron spectrometer utilizing two separate prototypes of the present invention and a standard inlet tube for comparison.

FIG. 2 shows the average ion current transmitted by the inlet tubes as a function of ESI source needle voltage. As is apparent from the figure, both the 45 degree and the 30 degree inlet tubes transmitted significantly more ions than the standard inlet tubes, with the 30 degree inlet tube yielding a factor of three improvement at ESI needle voltages below −2,500V. To establish that this enhancement is caused by improved transmission from the improved inlet tubes of the present invention, as opposed to being merely an improved transmission of solvated charged droplets, time of flight mass spectra were obtained under identical conditions in the region of m/z 129. This region corresponds to the analyte, $I^-$ ion peak. As shown in FIG. 3, the increase in signal of the mass resolved peak is proportional to the total ion current increase at the same ESI source needle voltage (c.a. −2000V). This confirms that the improved inlet tube of the present invention improves the transmission of useful ion current.

A second set of experiments was then conducted with a set of four improved inlet tubes. As with the first experiment, all inlet tubes were the same length (232 mm) and internal diameter of 0.8 mm. One inlet tube was a simple standard inlet tube 1. The other four inlet tubes 2 were configured with flared ends of angles at 10, 20, 30, and 45 degrees from the centerline. Each of the improved sample inlet tubes was flared to an interior diameter of 2 mm at the entrance to the tube. A sample mixture of sodium Iodide (10-3M) and 1,3-benzene disulfonic acid, disodium salt (10-3 M in a 1/3 ratio in $H_2O/CH_3O_4$ solvent solution) was used for comparison between the flared inlet tubes. The remaining considerations were identical to the first set of experiments.

Figure 4:
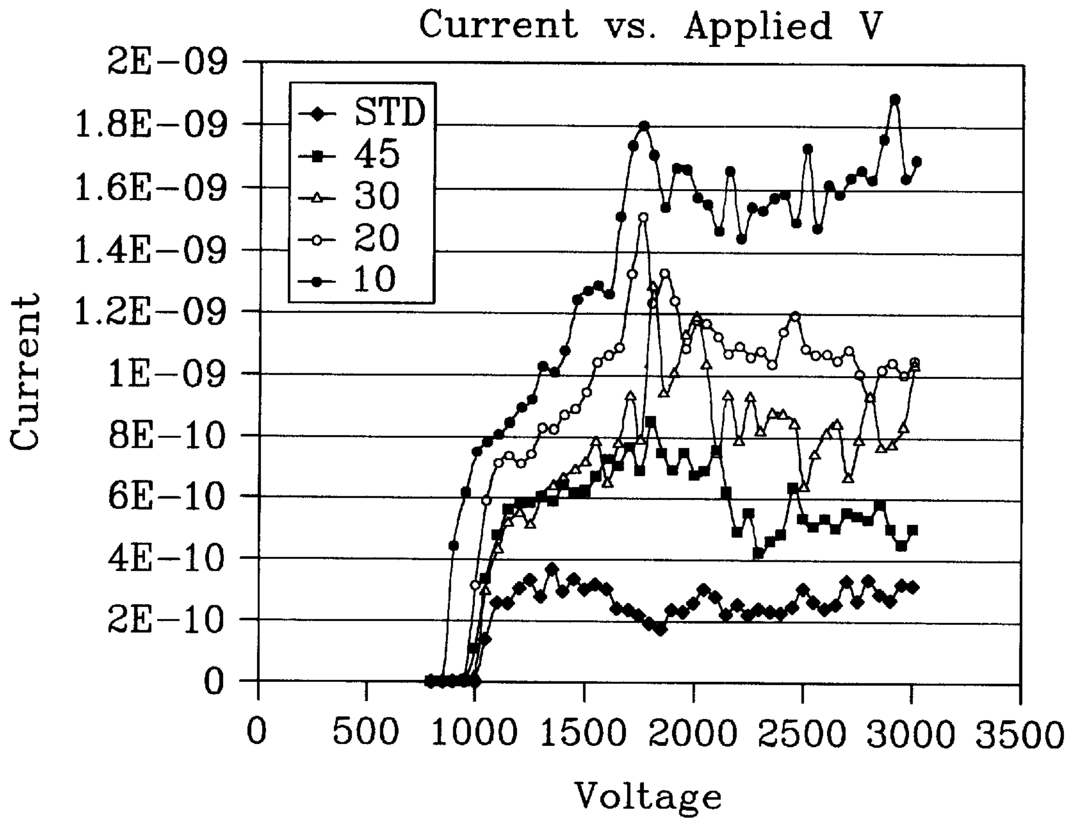
FIG. 4. Is a graph of the current of ions transmitted in second set of proof of principle experiments from an ESI source to a magnetic-bottle time of flight photoelectron spectrometer utilizing four separate prototypes of the present invention and a standard inlet tube for comparison.
Figure 5:
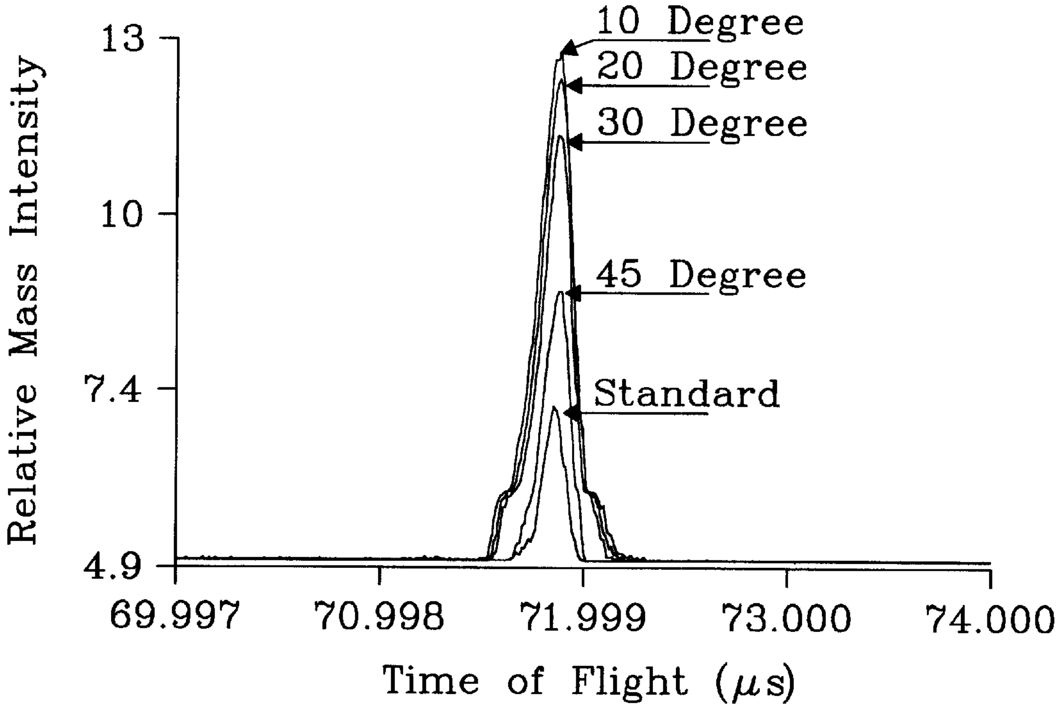
FIG. 5. Is a spectra of the relative mass intensity of ions detected in the second set of proof of principle experiments from an ESI source to a magnetic-bottle time of flight photoelectron spectrometer utilizing four separate prototypes of the present invention and a standard inlet tube for comparison.

FIG. 4 shows the average ion current transmitted by the inlet tubes in the second set of experiments as a function of ESI source needle voltages. As is apparent from the figure, the 10, 20 30 and 45 degree inlet tubes transmitted significantly more ions than the standard inlet tubes, with the 10 degree inlet tube showing the greatest improvement. Spectra were then obtained under identical conditions in the region of m/z 129. As shown in FIG. 5, a marked increase in signal of the mass resolved peak correlates with the increased ion current observed in FIG. 4

Figure 6:
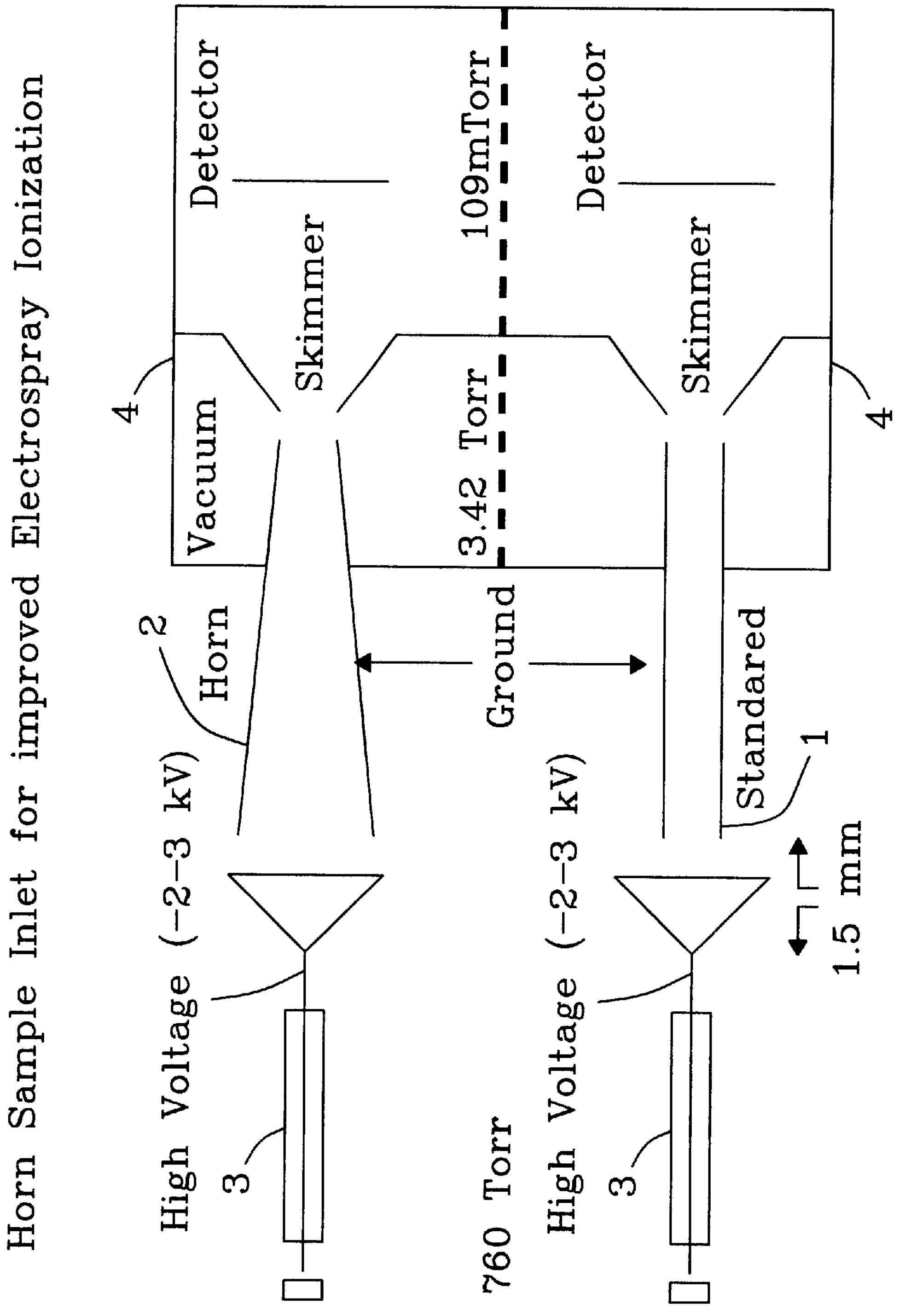
FIG. 6. Is a schematic drawing of a second preferred embodiment of the present invention.

FIG. 6, illustrates a standard inlet tube 2 and a second inlet tube 5 illustrating a second preferred embodiment of the present invention. As illustrated by the Figure, the improved inlet tube 5 is configured as a cone or horn as contrasted with the standard inlet tube 1 having parallel sides.

CLOSURE

While the preferred embodiment of the present invention has been shown and described, the invention should not be understood as limited to the particular examples set forth herein. Rather, as many variations and modifications will be readily apparent to those having skill in the art, the invention should be broadly construed as including all such other variations and modifications falling within the spirit and scope of the claims which follow and conclude this specification. For example, it will be apparent to those having skill in the art that the interior geometry of the improved inlet tube described herein may be readily duplicated by formiing the aperture to a given instrument as having the same geometry. Thus, the use of the term "inlet tube" in the appended claims should be construed as contemplating and including any such apertures fashioned with such an internal geometry.

We claim:

1. A method for improving the efficiency of the transmission of gaseous ions from an ion source in a region of relatively high pressure to the interior of a device maintained at a relatively low pressure comprising the steps of:

a) providing a flow of ions from said ion source, b) providing an aperture in said device, c) providing an inlet tube positioned within said aperture, said inlet tube having a larger end and a smaller end wherein said larger end is provided as having a larger interior diameter than the interior diameter of said smaller end, said inlet tube positioned within said aperture to provide said larger end in communication with said ion source, said smaller end in communication with said interior of said device, and d) directing ions produced by said ion source through said ion tube.

2. The method of claim 1 wherein said ion source is provided as an electrospray ionization source.

3. The method of claim 1 wherein said device is provided as a mass spectrometer.

4. The method of claim 1 wherein said ion source is selected from the methods consisting of thermal ionization, ion beams, electron impact ionization, laser irradiation, ionspray, electrospray, thermospray, inductively coupled plasmas, microwave plasmas, glow discharges, arc/spark discharges, hollow cathode discharges, gases generated by evaporation of condensed substances, laser ablation of condensed substances and mixtures thereof.

5. The method of claim 1 wherein said device is provided as selected from the group consisting of: a magnetic-bottle time of flight photoelectron spectrometer, a linear quadrupole mass spectrometer, an ion trap quadrupole mass spectrometer, an ion cyclotron resonance mass spectrometer, a time of flight mass spectrometer, and an electric and/or magnetic sector mass spectrometer.

6. An apparatus for improving the efficiency of the transmission of gaseous ions comprising:

a) an ion source in a region of relatively high pressure, b) an device having an interior maintained at a relatively low pressure and having an aperture through said device, and c) an inlet tube positioned within said aperture, said inlet tube having a larger end and a smaller end wherein said larger end has a larger interior diameter than the interior diameter of said smaller end, and said inlet tube positioned within said aperture to provide said larger end in communication with said ion source, said smaller end in communication with said interior of said device.

7. The apparatus of claim 6 wherein said ion source is provided as an electrospray ionization source.

8. The apparatus of claim 6 wherein said device is provided as a mass spectrometer.

9. The apparatus of claim 6 wherein said ion source is selected from the group consisting of thermal ionization, ion beams, electron impact ionization, laser irradiation, ionspray, electrospray, thermospray, inductively coupled plasmas, microwave plasmas, glow discharges, arc/spark discharges, hollow cathode discharges, gases generated by evaporation of condensed substances, laser ablation of condensed substances and mixtures thereof.

10. The apparatus of claim 6 wherein said device is provided as selected from the group consisting of: a magnetic-bottle time of flight photoelectron spectrometer, a linear quadrupole mass spectrometer, an ion trap quadrupole mass spectrometer, an ion cyclotron resonance mass spectrometer, a time of flight mass spectrometer, and an electric and/or magnetic sector mass spectrometer.

* * * * *